(12) United States Patent
Meggiolan

(10) Patent No.: US 8,777,328 B2
(45) Date of Patent: Jul. 15, 2014

(54) RIM FOR A BICYCLE WHEEL AND BICYCLE WHEEL COMPRISING SUCH A RIM

(75) Inventor: Mario Meggiolan, Creazzo (IT)

(73) Assignee: Campagnolo S.r.l., Vicenza (IT)

( * ) Notice: Subject to any disclaimer, the term of this patent is extended or adjusted under 35 U.S.C. 154(b) by 627 days.

(21) Appl. No.: 12/268,019

(22) Filed: Nov. 10, 2008

(65) Prior Publication Data

US 2009/0134695 A1    May 28, 2009

(30) Foreign Application Priority Data

Nov. 26, 2007  (IT) .............................. M12007A2232

(51) Int. Cl.
*B60B 21/02*    (2006.01)

(52) U.S. Cl.
USPC ................... 301/95.104; 301/95.101; 301/55

(58) Field of Classification Search
USPC .................... 301/58, 95.101, 95.104, 95.106
See application file for complete search history.

(56) References Cited

U.S. PATENT DOCUMENTS

| | | |
|---|---|---|
| 395,523 A | 1/1889 | Taylor |
| 401,551 A | 4/1889 | Gilles |
| 452,649 A | 5/1891 | Powell |
| 521,385 A | 6/1894 | Mosley |
| 531,914 A | 1/1895 | Donnelly |
| 677,319 A | 6/1901 | McConville |
| 707,335 A | 8/1902 | Kenyon |
| 759,124 A | 5/1904 | Oswald |
| 1,286,065 A | 11/1918 | Murray |
| 1,377,173 A | 5/1921 | Allen |
| 1,393,797 A | 10/1921 | Lachman |
| 1,402,003 A | 1/1922 | Miller |
| RE15,366 E | 5/1922 | Dressel |
| 1,467,588 A | 9/1923 | Prescott et al. |
| 1,484,844 A | 2/1924 | Ollie |
| 1,542,630 A | 6/1925 | Meredith |
| 1,667,344 A | 4/1928 | Couture |
| 1,684,290 A | 9/1928 | Starling |

(Continued)

FOREIGN PATENT DOCUMENTS

| | | |
|---|---|---|
| BE | 398573 | 10/1933 |
| CH | 179922 | 9/1935 |

(Continued)

OTHER PUBLICATIONS

Campagnolo Products Catalogue 2005, pp. 92-97.

(Continued)

*Primary Examiner* — Jason Bellinger
(74) *Attorney, Agent, or Firm* — Volpe and Koenig, P.C.

(57) ABSTRACT

A rim (1) for a bicycle wheel, having a body (5) with a substantially annular extension and a radially outer portion (6a) shaped for coupling with a tire is disclosed. The radially outer portion (6a) includes an annular bottom wall (12) provided with a hole for an inflation valve, and the annular bottom wall (12) defines a central annular recess (20) and two side annular portions (24) arranged on axially opposite sides with respect to the central annular recess (20). The recess (20) includes, on at least one side, and in at least one circumferentially distal area from the hole with reference to a cross section of the rim (1), a radially inner surface (26) and a radially outer surface (28). The radially outer surface (28) has a different bending radius than that of the radially inner surface (26).

20 Claims, 11 Drawing Sheets

(56) References Cited

U.S. PATENT DOCUMENTS

| | | | |
|---|---|---|---|
| 1,689,649 A | 10/1928 | Wagehoest |
| 1,833,879 A | 11/1931 | Ash |
| 1,847,774 A | 3/1932 | Main et al. |
| 1,889,577 A | 11/1932 | Milton |
| 2,840,133 A | 6/1958 | Billingsley |
| 2,937,905 A | 5/1960 | Altenburger |
| 3,253,862 A | 5/1966 | Watanbe et al. |
| 3,758,931 A | 9/1973 | Patterson |
| 4,040,671 A | 8/1977 | Hersh |
| 4,146,274 A | 3/1979 | Lejeune |
| 4,153,267 A | 5/1979 | Hilber |
| 4,173,992 A | 11/1979 | Lejeune |
| 4,181,365 A | 1/1980 | Kawaguchi et al. |
| 4,376,749 A | 3/1983 | Woelfel |
| 4,527,839 A | 7/1985 | Fujitaka et al. |
| 4,564,056 A | 1/1986 | Doring |
| 4,574,446 A | 3/1986 | Kaufeldt et al. |
| 4,614,678 A | 9/1986 | Ganga |
| 4,702,527 A | 10/1987 | Kawano |
| 4,749,235 A | 6/1988 | McDougall |
| 4,832,414 A | 5/1989 | Jones |
| 4,909,576 A | 3/1990 | Zampieri |
| 4,983,430 A | 1/1991 | Sargent |
| 5,073,315 A | 12/1991 | Bertelson |
| 5,215,137 A | 6/1993 | Weeks et al. |
| 5,271,663 A | 12/1993 | Maldini et al. |
| 5,512,119 A | 4/1996 | Takezawa et al. |
| 5,522,630 A | 6/1996 | James |
| 5,534,203 A | 7/1996 | Nelson et al. |
| 5,540,485 A | 7/1996 | Enders |
| 5,549,360 A | 8/1996 | Lipeles |
| 5,603,553 A | 2/1997 | Klieber et al. |
| 5,653,510 A | 8/1997 | Osborne |
| 5,919,044 A | 7/1999 | Sicurelli, Jr. et al. |
| 5,960,834 A | 10/1999 | Sekido et al. |
| 5,975,646 A | 11/1999 | Campagnolo |
| 6,024,413 A | 2/2000 | Dixon et al. |
| 6,036,279 A | 3/2000 | Campagnolo |
| 6,048,035 A | 4/2000 | Chen |
| 6,086,161 A | 7/2000 | Luttgeharm et al. |
| 6,089,672 A | 7/2000 | Chen |
| 6,126,243 A | 10/2000 | Okajima et al. |
| 6,155,651 A | 12/2000 | Mizata et al. |
| 6,183,047 B1 | 2/2001 | Kuhl |
| 6,190,481 B1 | 2/2001 | Iida et al. |
| 6,196,638 B1 | 3/2001 | Mizuno et al. |
| 6,228,474 B1 | 5/2001 | Kishi et al. |
| 6,237,662 B1 | 5/2001 | Thomasberg |
| 6,257,676 B1 * | 7/2001 | Lacombe et al. ............... 301/58 |
| 6,318,428 B1 | 11/2001 | Lo |
| 6,347,839 B1 | 2/2002 | Lew et al. |
| 6,367,883 B1 | 4/2002 | Chen |
| 6,378,953 B2 | 4/2002 | Mercat et al. |
| 6,402,256 B1 | 6/2002 | Mercat |
| 6,425,641 B1 | 7/2002 | Herting |
| 6,443,533 B2 | 9/2002 | Lacombe et al. |
| 6,450,226 B2 | 9/2002 | DeLacroix et al. |
| 6,536,849 B1 | 3/2003 | Okajima et al. |
| 6,557,946 B1 | 5/2003 | Gerrit et al. |
| 6,588,474 B2 | 7/2003 | Passarotto |
| 6,593,255 B1 | 7/2003 | Lawton et al. |
| 6,672,352 B2 | 1/2004 | Yamagiwa et al. |
| 6,761,847 B2 | 7/2004 | Meggiolan |
| 6,783,192 B2 | 8/2004 | Meggiolan |
| 6,926,370 B2 | 8/2005 | Spoelstra |
| 6,938,962 B1 | 9/2005 | Schlanger |
| 6,957,926 B2 | 10/2005 | Okuda |
| 6,991,300 B2 | 1/2006 | Colegrove |
| 7,032,769 B2 | 4/2006 | Iida et al. |
| 7,090,307 B2 * | 8/2006 | Okajima ............... 301/95.107 |
| 7,431,404 B2 | 10/2008 | Senoo |
| 7,448,696 B2 | 11/2008 | Meggiolan et al. |
| 7,487,811 B2 | 2/2009 | Schelhaas |
| 2001/0005913 A1 | 7/2001 | Elsener et al. |
| 2001/0019222 A1 | 9/2001 | Campagnolo |
| 2002/0066316 A1 | 6/2002 | Kashiwai et al. |
| 2002/0067066 A1 | 6/2002 | Kashiwai et al. |
| 2002/0108249 A1 | 8/2002 | Meggiolan |
| 2004/0095014 A1 | 5/2004 | Veux et al. |
| 2004/0139609 A1 | 7/2004 | Meggiolan et al. |
| 2005/0017569 A1 | 1/2005 | Passarotto |
| 2005/0189813 A1 | 9/2005 | Bauer |
| 2005/0210675 A1 | 9/2005 | Price et al. |
| 2006/0043784 A1 | 3/2006 | Passarotto |
| 2006/0071540 A1 | 4/2006 | Koziatek |
| 2006/0181140 A1 | 8/2006 | Mercat et al. |
| 2006/0200989 A1 | 9/2006 | Possarnig et al. |
| 2007/0063577 A1 | 3/2007 | Passarotto |
| 2007/0158996 A1 | 7/2007 | Meggiolan |
| 2009/0134693 A1 | 5/2009 | Meggiolan |
| 2009/0134695 A1 | 5/2009 | Meggiolan |
| 2009/0250994 A1 | 10/2009 | Meggiolan |
| 2010/0013119 A1 | 1/2010 | Meggiolan |
| 2011/0127827 A1 | 6/2011 | Andrews |

FOREIGN PATENT DOCUMENTS

| | | |
|---|---|---|
| CH | 218795 | 12/1941 |
| CN | 2709212 | 7/2005 |
| DE | 4127500 C1 | 10/1992 |
| DE | 4425592 A1 | 1/1996 |
| DE | 4444044 A1 | 6/1996 |
| DE | 102004055892 | 5/2006 |
| DE | 102006029468 | 8/2007 |
| EP | 0154666 | 9/1985 |
| EP | 0240241 A2 | 10/1987 |
| EP | 0324630 A2 | 7/1989 |
| EP | 0579525 | 1/1994 |
| EP | 0615865 | 9/1994 |
| EP | 0715001 | 6/1996 |
| EP | 0893280 | 1/1999 |
| EP | 0896886 A1 | 1/1999 |
| EP | 1084868 A1 | 3/2001 |
| EP | 1101631 A1 | 5/2001 |
| EP | 0936085 A3 | 10/2001 |
| EP | 1167078 A1 | 1/2002 |
| EP | 1231077 A2 | 8/2002 |
| EP | 1260382 A2 | 11/2002 |
| EP | 1314579 A2 | 5/2003 |
| EP | 1314579 A3 | 5/2003 |
| EP | 1479533 | 11/2004 |
| FR | 657185 | 5/1929 |
| FR | 833629 | 6/1937 |
| FR | 2474403 | 7/1981 |
| FR | 2765150 | 6/1997 |
| GB | 281229 | 5/1928 |
| GB | 913967 | 12/1962 |
| GB | 2009662 | 6/1979 |
| JP | 33006601 | 11/1930 |
| JP | 5553632 | 10/1953 |
| JP | 56102201 | 1/1955 |
| JP | 329153 | 7/1955 |
| JP | 49042132 | 11/1974 |
| JP | 5125421 | 6/1976 |
| JP | 57091603 | 6/1982 |
| JP | 60080902 | 10/1983 |
| JP | 58191601 | 11/1983 |
| JP | 59193702 | 12/1984 |
| JP | 60012315 A | 1/1985 |
| JP | 60157901 | 8/1985 |
| JP | 60275078 | 9/1985 |
| JP | 61118801 | 7/1986 |
| JP | 61175005 | 10/1986 |
| JP | 62119639 | 5/1987 |
| JP | 62227801 A | 10/1987 |
| JP | 62275801 A | 11/1987 |
| JP | 63031802 | 2/1988 |
| JP | 01226401 | 9/1989 |
| JP | 04306101 | 10/1992 |
| JP | 07117423 | 5/1995 |
| JP | 08207503 | 8/1996 |
| JP | 3025849 | 10/1996 |
| JP | 2002166702 | 11/2002 |
| JP | 2002321501 A | 11/2002 |

(56) References Cited

FOREIGN PATENT DOCUMENTS

| | | |
|---|---|---|
| JP | 2003019901 A | 1/2003 |
| JP | 2003094902 | 4/2003 |
| JP | 2003098027 | 4/2003 |
| JP | 2003260901 | 9/2003 |
| JP | 200372301 | 12/2003 |
| JP | 2005053476 A | 3/2005 |
| RU | 2096188 C1 | 7/1996 |
| TW | 497556 | 8/2002 |
| TW | 505113 | 10/2002 |
| WO | 9309963 | 11/1992 |
| WO | 0232695 | 4/2002 |
| WO | 0240295 | 5/2002 |
| WO | 2007027927 | 3/2007 |

OTHER PUBLICATIONS

European Search Report—EP 08006139.3-2421.
European Search Report—EP 08425161.0-2421—dated Aug. 18, 2008.
European Search Report—EP 08006140.1—dated Mar. 25, 2009.
European Search Report—EP 08006139.3-2421—dated Apr. 6, 2009.
Extended European Search Report—Application No. 08006139.3-2421—dated Jul. 30, 2009.
English translation of Office Action for Japanese Patent Appln. No. 2004-329603—dated Dec. 8, 2009.
English translation of Office Action for Japanese Patent Appln. No. 2005-251583—dated Jul. 13, 2010.
English translation of Office Action issued in corresponding Taiwanese Appln. 094129965—dated Apr. 20, 2011.
Japanese Office Action for Japanese Patent Appln. No. 2005-251583—dated May 10, 2011.
English translation of Office Action for Japanese Patent Appln. No. 2005-251583—dated May 10, 2011.
Chinese Office Action for Chinese Patent Appln. No. 200810177972.2—dated May 18, 2011.
English translation of Office Action for Chinese Patent Appln. No. 200810177972.2—dated May 18, 2011.
Japanese Office Action with English translation issued Jun. 18, 2013 in corresponding Japanese Patent Application No. 2008-299358.

* cited by examiner

RIM FOR A BICYCLE WHEEL AND BICYCLE WHEEL COMPRISING SUCH A RIM

FIELD OF INVENTION

The present description relates to a rim for a bicycle wheel, in particular for a tubeless wheel.

The present description also relates to a bicycle wheel comprising such a rim, and a bicycle comprising such a wheel. Preferably, the bicycle is a racing bicycle.

The description also relates to a band adapted to seal the holes for the assembly of spokes in a rim for a tubeless bicycle wheel, and a rim comprising such a band. The description also relates to a bicycle wheel comprising such a rim and a bicycle comprising such a wheel.

BACKGROUND

Typically, a bicycle wheel comprises a rim, on which a tire, a hub and a plurality of spokes extending between the rim and the hub are mounted.

Amongst the various types of bicycle wheels, the use of the type known as "tubeless," i.e. without an air chamber, is now widespread. In particular, in tubeless wheels, the tire is mounted airtight on the rim, so as to form an airtight annular area in which pressurized air is introduced through an inflation valve associated with the rim at a suitable hole formed in the rim.

The airtight annular area of the tubeless wheels is defined by an inner surface of the tire and by an outer surface of the rim. In particular, the rim includes a body with a substantially annular extension having a radially outer portion provided with an annular bottom wall, or upper bridge of the rim, and a pair of annular side walls, or fins, extending radially outwards from the upper bridge. The fins hold the radially inner end edges, or beads, of the tire, in a final assembled configuration of the tire, against the thrust of the pressurized air, achieving the airtight coupling between tire and rim.

The outer surface of the rim that delimits the airtight annular area is therefore defined by the radially outer surface of the upper bridge and by the axially inner surfaces of the fins.

The hole for the inflation valve is typically formed in an annular recess formed in a central annular portion of the upper bridge of the rim. The upper bridge preferably has no further holes. In particular, no holes are provided for the assembly of the spokes of the wheel; such holes are instead generally provided in a radially inner portion of the rim. In those cases in which the holes for the assembly of the spokes are present in the upper bridge, they are suitably sealed through a sealing band such as the rubber band described in US2004/0095014.

The annular recess formed in the upper bridge of the rim defines an annular channel for housing at least one of the beads of the tire, preferably for both of the beads, in an initial assembly step of the tire on the rim. In this step, the beads are housed in the annular recess so as to be pushed into contact with the side walls of the recesses. After this step, the tire is inflated by feeding pressurized air into the chamber defined between the tire and the upper bridge. In this step, the beads of the tire slide on the upper bridge, through the effect of the pressurized air, until the fins of the rim are reached, with which they couple to hold the tire against the thrust of the pressurized air in the final assembled configuration of the tire.

In the inflation step, it is necessary to ensure the airtight connection between tire and upper bridge during sliding of the beads of the tire on the upper bridge. This step is therefore very delicate and requires feeding of air at high pressure.

SUMMARY

The present description relates to a bicycle wheel rim having an annular tubular body defined by a radially outer wall, and radially inner wall, connected by first and second side walls. The radially outer wall includes an upper bridge having a plurality of curved surfaces.

DETAILED DESCRIPTION OF THE PREFERRED EMBODIMENT(S)

Introduction to the Embodiments

Figure 1:
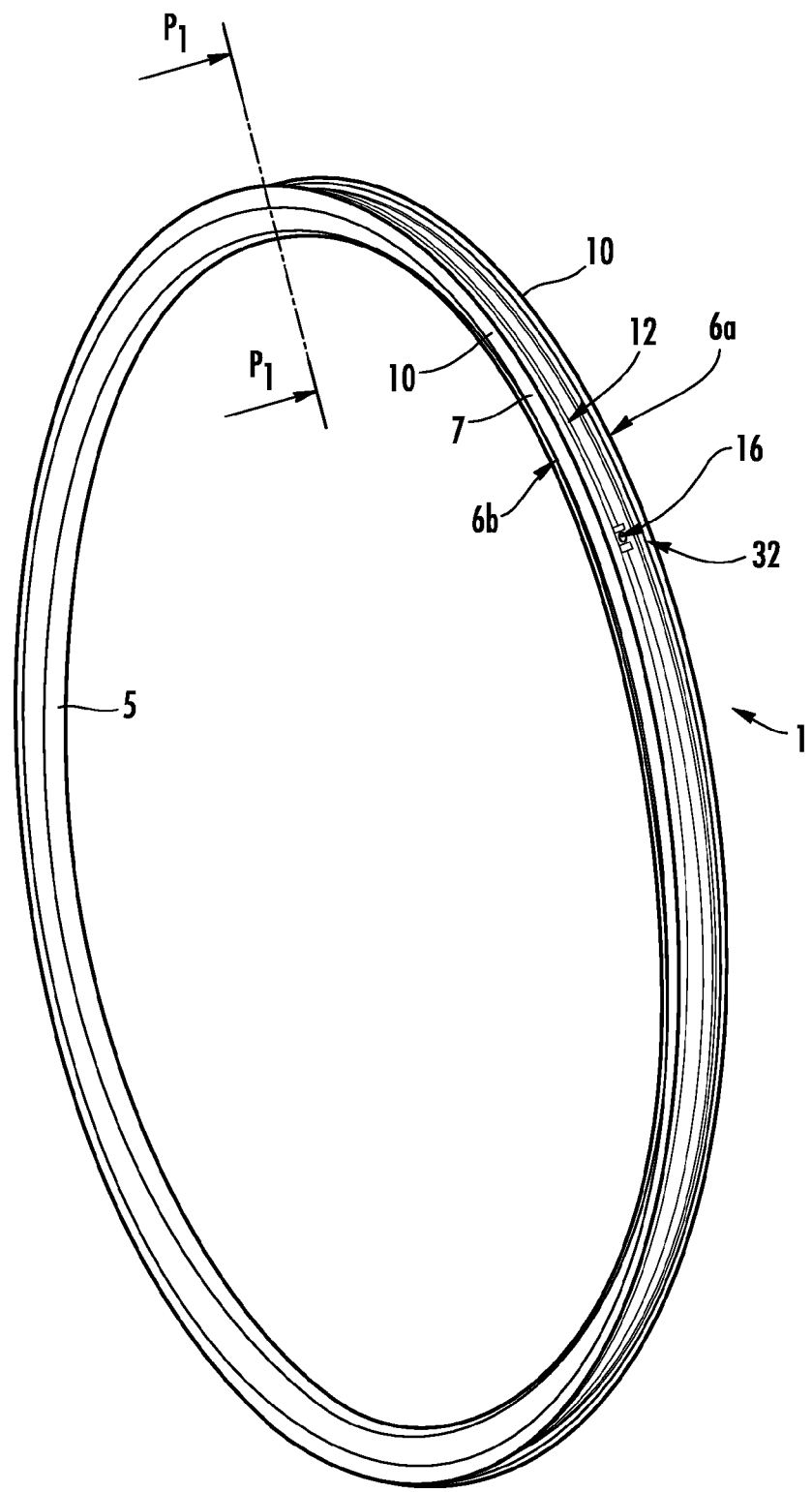
FIG. 1 schematically shows a perspective view of a rim for a bicycle wheel.

The present description relates, in a first aspect thereof, to a rim for a bicycle wheel comprising a body with a substantially annular extension having a radially outer portion shaped for coupling with a tire. The radially outer portion comprises an annular bottom wall provided with a hole for an inflation valve. The annular bottom wall comprises a central annular recess and two side annular portions arranged on axially opposite sides with respect to the central annular recess. The recess comprises, at least on one side thereof and at least in a circumferentially distal area from the hole, with reference to a cross section of the rim, a radially inner surface and a radially outer surface. The radially outer surface has a different bending radius than that of the radially inner surface.

Throughout the present description and in the subsequent claims, the "annular bottom wall" of the radially outer portion of the rim will often also be referred to as "upper bridge." Moreover, in the present description and in the subsequent claims, the terms "axially," or "axial," and "radially," or "radial," are used with reference respectively to directions substantially parallel to the rotational axis of the rim, and to directions substantially perpendicular to the rotational axis of the rim. The term "circumferentially," or "circumferential," on the other hand, is used with reference to the direction of annular extension of the rim.

The provision of an annular recess provided with radially inner and outer surfaces having a different bending radii, allows the most suitable bending radius to be selected according to the material from which rim and tire are made, thus optimizing the geometry of the upper bridge based on the particular application. In this way, it is possible to always ensure easy and efficient assembly of the tire on the rim, and high reliability of the wheel in operation for all types of rims and tires used.

Preferably, the radially outer surface is a curved surface, and more preferably, a convex surface, whereas the radially inner surface preferably comprises at least one curved surface portion, and more preferably, a concave surface.

In the present description and in the subsequent claims the term "curved surface," shall be defined as a non-flat surface having a single bending radius or many bending radii, regardless of whether the surface is concave or convex.

The provision of curved surfaces makes it easier for the beads to slide from the base of the recess towards its top in the initial assembly step of the tire.

Preferably, the rim is symmetrical, and therefore we shall often refer in the present description to a symmetrical rim. However, it should be understood that what is described can also be applied to an asymmetrical rim.

Preferably, the at least one curved surface portion and the radially outer surface are connected in a common tangent point. The path travelled by the beads of the tire is therefore, as well as easy, gradual and uninterrupted.

Preferably, the bending radius of the radially outer surface is greater than that of the at least one curved portion of the radially inner surface.

The fact that the radially outer surfaces of the annular recess are made with a curved profile with a greater bending radius than that of the radially inner surface of the recess creates a more gradual variation in curvature of the profile of the upper bridge between its central annular portion and its side annular portions. The desired airtight coupling during the sliding of the beads of the tire on the upper bridge of the rim during the inflation of the tire, and the correct coupling between beads of the tire and fins of the rim at the end of the inflation of the tire, are thus ensured in a simpler and more effective way than in the rims of the prior art. The assembly of the tire on the rim is made simpler and easier, as well as optimal in terms of efficiency and reliability.

The aforementioned features are particularly valuable considering of the fact that, in order to be able to house the beads in the annular recess in the initial assembly step of the tire on the rim, it is necessary for the annular recess formed in the upper bridge of the rim to have a certain depth, such a depth being dictated by the size of the tire. If, for the same size of tire, such a depth were less, it would be extremely difficult, once a portion of the bead is housed in the recess, to pass it over the fin of the rim in order to also place a portion of the bead in the diametrically opposite recess. This would require an excessive deformation of the bead of the tire, such a deformation however being only possible up to a certain limit due to the intrinsic rigidity of the beads. Therefore, given that the annular recess of the upper bridge cannot have a depth below a certain value, the fact that a greater bending radius is provided for the radially outer surfaces of the annular recess, than that of the radially inner surfaces, facilitates passing of the beads, during the initial assembly step of the tire, from the annular recess towards the fins of the rim.

The Applicant has found that the aforementioned features are particularly valuable in the case in which the bending radius of the radially outer surface is equal to about twice, with a possible approximation of a few tenths of a millimeter, that of the at least one curved portion of the radially inner surface.

In the preferred embodiment of the rim, the annular bottom wall comprises, between the radially outer surface and at least one of the side annular portions, a projecting surface. Such a projecting surface prevents the beads of the tire from accidentally moving towards the recess of the upper bridge due to lateral knocks on the wheel, in which case an undesired air leakage may occur.

Preferably, such a projecting annular surface is defined by a curved surface. This makes it easier for the beads of the tire to pass over the projecting surface during the initial assembly step of the tire, making easier the sliding of the beads of the tire from the side walls of the recess towards the fins of the rim.

Preferably, the radially outer surface and the projecting surface are connected at a common tangent point. The path travelled by the beads of the tire is thus gradual and without discontinuity, even at the top of the recess.

Preferably, the side annular portions are substantially perpendicular to a plane of longitudinal symmetry of the rim. In this way the sliding of the beads of the tire from the fins of the rim towards the recess of the upper bridge is further blocked in case of lateral knocks on the wheel. Such sliding would be made easier if the side annular portions were inclined towards the rotational axis of the rim as one moves axially from the fins towards the plane of longitudinal symmetry of the rim.

In a first embodiment of the rim, the radially inner surface of the recess is entirely defined by a curved surface having a single bending radius.

In an alternative embodiment of the rim, the radially inner surface of the recess is defined by a curved surface having many bending radii. In this case, the curved surface preferably has a first bending radius at a radially inner portion thereof and a second bending radius at a radially outer portion thereof opposite to the central annular area.

Preferably, the second bending radius is smaller than the first bending radius.

Preferably, the at least one curved surface portion is defined at the radially outer annular portion.

In a further alternative embodiment of the rim, the radially inner surface is defined by a substantially flat surface portion and a curved surface portion. In this case, the flat surface portion is preferably disposed axially inward with respect to the curved surface portion.

In the rim, the central annular recess can have the same geometry along the entire annular extension of the rim.

In a particularly preferred embodiment of the rim, the annular recess has a different geometry at the hole for the inflation valve. In this case, the annular recess comprises, at least on one side thereof and near the hole, with reference to a cross section of the rim, a radially outer surface that is at least partially flat and a radially inner surface that is substantially flat.

Such geometry of the upper bridge at the hole for the inflation valve allows a seat to be defined for housing the head of the inflation valve of the tire. This configuration ensures the airtight coupling of the inflation valve in the respective hole provided in the rim and facilitates the assembly operations of the valve onto the rim. The inflation valve typically comprises a stem adapted to pass through the hole formed in the upper bridge of the rim, and a widened head with respect to the stem. A ring nut is screwed into the stem to abut a radially inner surface of the rim, to prevent the stem from sliding in a radially outer direction with respect to the rim. The screwing of the ring nut in the rims of the prior art could cause the rotation of the head of the valve, a rotation that in the rim of the present description is prevented by the abutment of the head of the valve against the substantially flat inner surface of the recess.

Preferably, the radially outer surface comprises a flat surface portion adjacent to the radially inner surface and a curved surface portion arranged on the opposite side to the radially inner surface with respect to the flat surface portion. More preferably, the curved surface portion has the same bending radius as that of the radially outer surface of the recess at the area distal from the hole.

Such geometry makes it possible to achieve easy and effective airtight sliding of the beads of the tire on the upper bridge in the initial assembly step of the tire, airtight housing of the inflation valve in the respective hole, and simplification of the assembly operations of the valve on the rim.

In one preferred embodiment, the rim is for a tubeless wheel, made from metallic material or from structural composite material, as defined below.

In a second aspect thereof, the present description relates to a bicycle wheel comprising a rim of the type described above.

Preferably, such a wheel has, individually or in combination, all of the structural and functional characteristics discussed above with reference to the rim.

In a third aspect thereof, the present description relates to a bicycle comprising the aforementioned wheel.

Preferably, such a bicycle has, individually or in combination, all of the structural and functional characteristics discussed above with reference to the rim.

In a fourth aspect thereof, the present description relates to a band for sealing holes for the assembly of spokes in a rim for a tubeless bicycle wheel, characterized in that it has, in a transversal section thereof, an outer surface with a profile that is identical to at least that of the radially outer surface of the central annular recess formed in the annular bottom wall of the rim, as described above.

Such a band, as well as sealing the holes for the spokes, to allow inflation of the tire in a tubeless wheel provided on the upper bridge with holes for the assembly of spokes, gives the upper bridge the desired cross sectional profile, such a profile imparting the same advantages described with reference to the rim.

The band can have an identical profile to that of just the recess, or to that of the radially outer surface of the entire annular bottom wall of the rim.

In a fifth aspect thereof, the present description relates to a rim for a tubeless bicycle wheel, comprising a body with a substantially annular extension, having a radially outer portion shaped for coupling with a tire, the radially outer portion comprising an annular bottom wall having a central annular recess in which a first hole for an inflation valve and a plurality of second holes for the assembly of respective spokes are formed, circumferentially spaced apart, the second holes being sealed with a band of the type described above.

In a sixth aspect thereof, the present description relates to a bicycle wheel comprising a rim provided with the band described above.

In a seventh aspect thereof, the present description relates to a bicycle comprising the aforementioned wheel.

DETAILED DESCRIPTION

Figure 2:
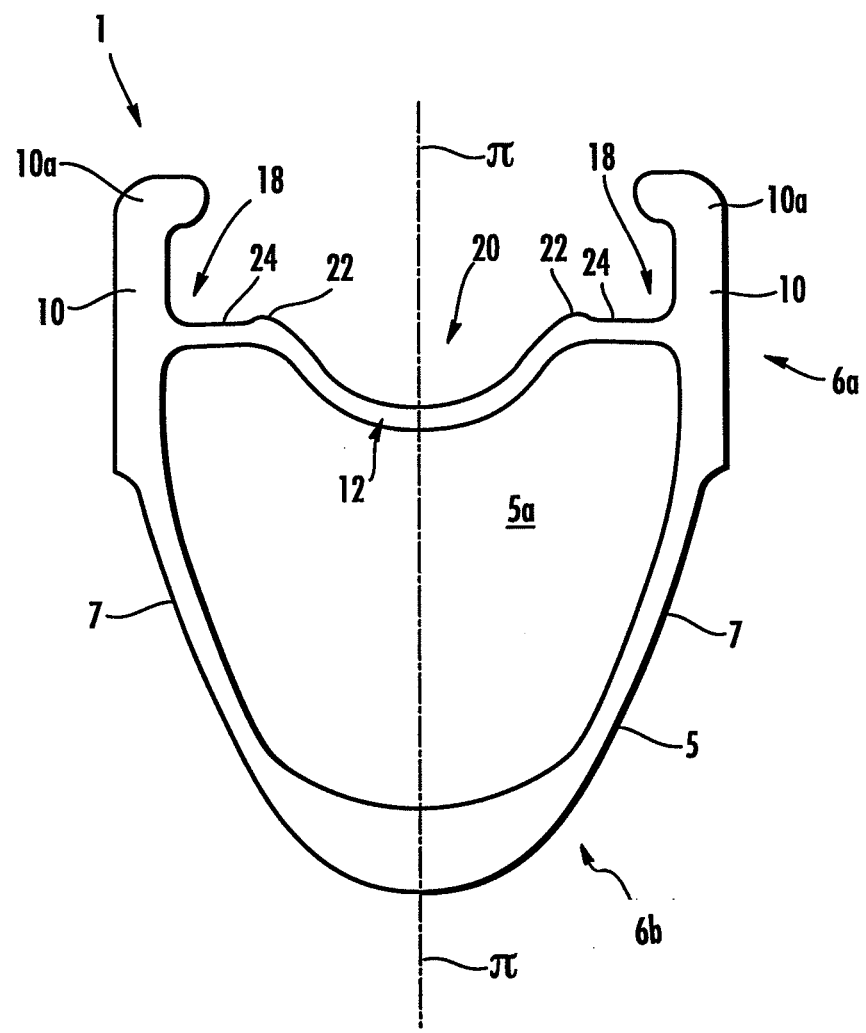
FIG. 2 schematically shows a cross section of a first embodiment of the rim of FIG. 1 taken along the plane P1 in FIG. 1.

With initial reference to FIGS. 1 and 2, a rim for a bicycle wheel is indicated with 1. The rim is intended to be used in a tubeless wheel, preferably for a racing bicycle.

The rim 1 comprises a body 5 having a substantially annular extension. The body 5 is configured to house and hold, in a final assembled configuration of the tire, radially inner end edges 42 of a tire 40 (FIG. 9), commonly known as beads 42. The body 5 is also configured to make the assembly steps of the tire 40 easier, as shall be explained hereafter.

The body 5 comprises a radially outer portion 6a with which the tire 40 is intended to be coupled and a radially inner portion 6b formed as a single piece with the radially outer portion 6a. As shown in FIG. 1, and in greater detail in FIG. 2, the radially inner portion 6b is connected to the radially outer portion 6a through two side walls 7, thus forming a tubular structure 5a. The provision of the radially inner portion 6b in the rim 1 offers easy fixing areas for the spokes of the wheel (holes for attaching the spokes are not illustrated in the attached FIGS.).

The radially outer portion 6a comprises an annular bottom wall 12, or upper bridge, and a pair of annular side walls 10, or fins, extending substantially in the radial direction outwards from the bottom wall 12. The side walls 10 each comprise a radially outer end portion 10a curved towards a plane of longitudinal symmetry Π (illustrated in FIG. 2) of the rim 1.

Figure 6:
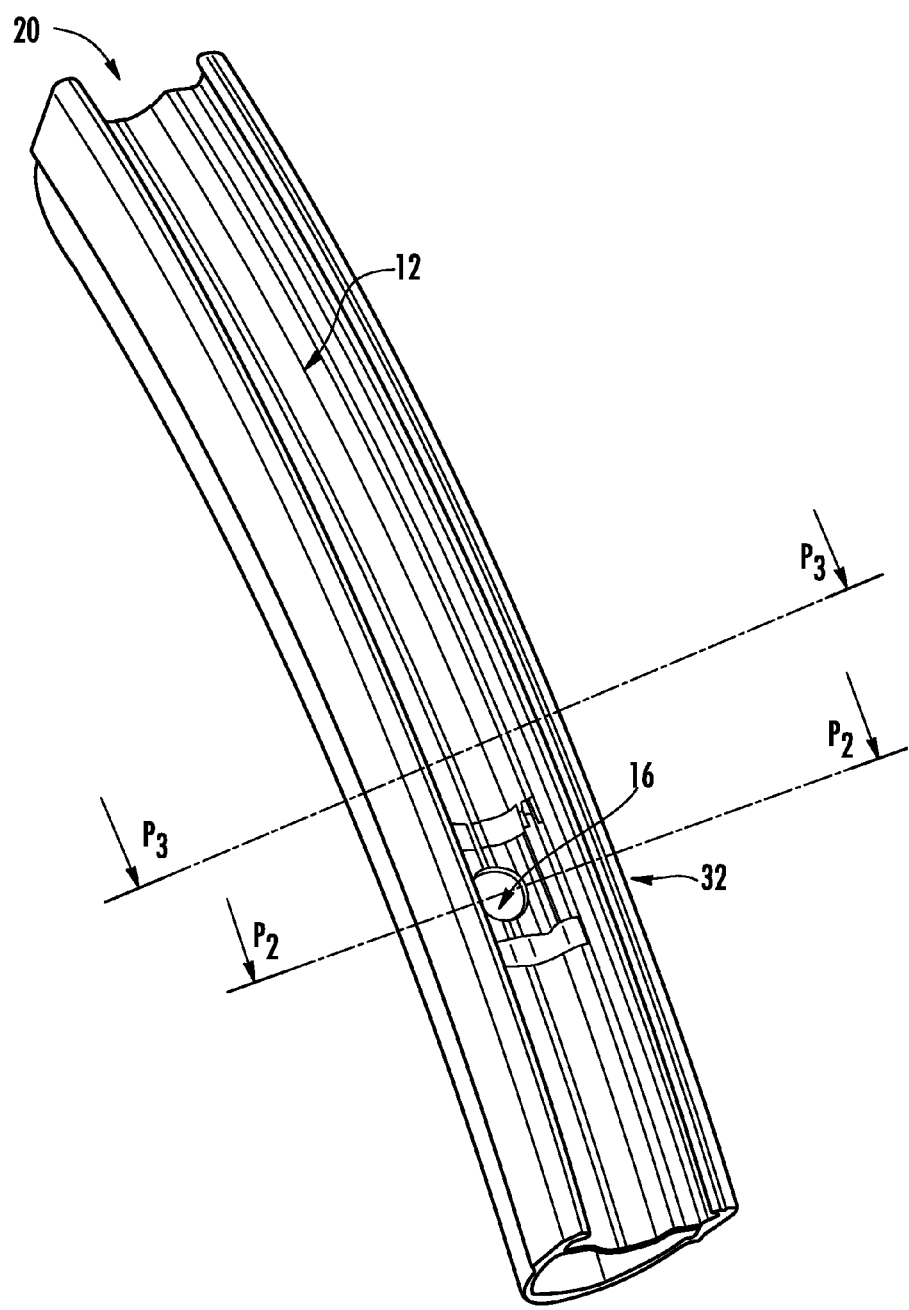
FIG. 6 schematically shows an enlarged view of a portion of the rim of FIG. 1.
Figure 9:
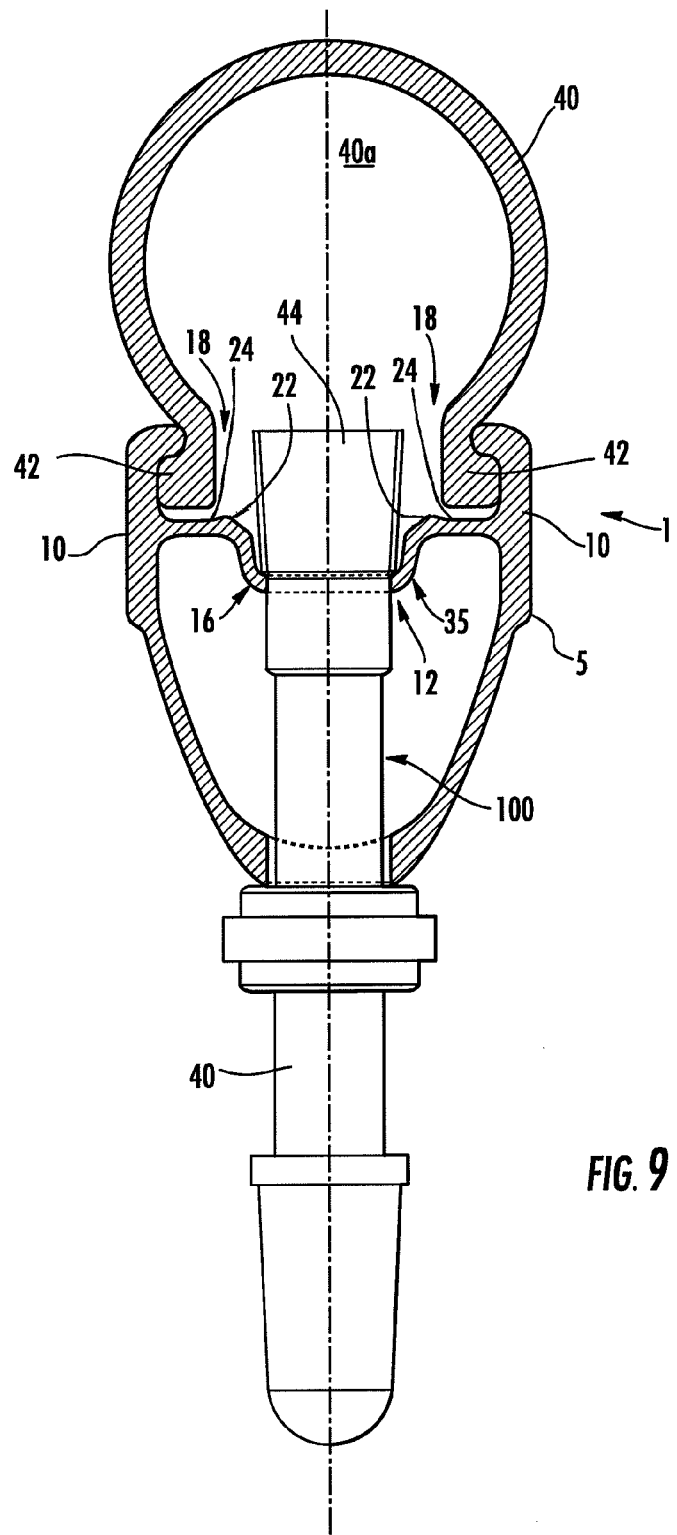
FIG. 9 schematically shows a cross section of the rim of FIG. 1, taken along the plane P2 in FIG. 6, to which an inflation valve and a tire in a final assembled configuration of the tire onto the rim have been added.

The bottom wall 12 has no holes, with the exception of a hole 16 adapted to house an inflation valve 100 of the tire 40 (FIGS. 1, 6 and 9).

FIG. 9 shows how the side walls 10 cooperate with the tire 40 and with the bottom wall 12 to form an airtight chamber 40a between them. The annular side walls 10, and in particular the radially outer end portions 10a thereof, hold the tire 40 in the final assembled configuration counteracting the thrust of the pressurized air on the tire 40, thus generating an airtight coupling.

With reference to FIGS. 1, 2 and 6, the body 5 has a uniform geometry along the entire annular extension thereof, except in the area in which the hole 16 is provided, as shall be better described hereafter. In an alternative embodiment of the rim 1, the geometry of the body 5 is uniform along the entire annular extension of the rim, the only discontinuity being defined by the hole 16.

Figure 7:
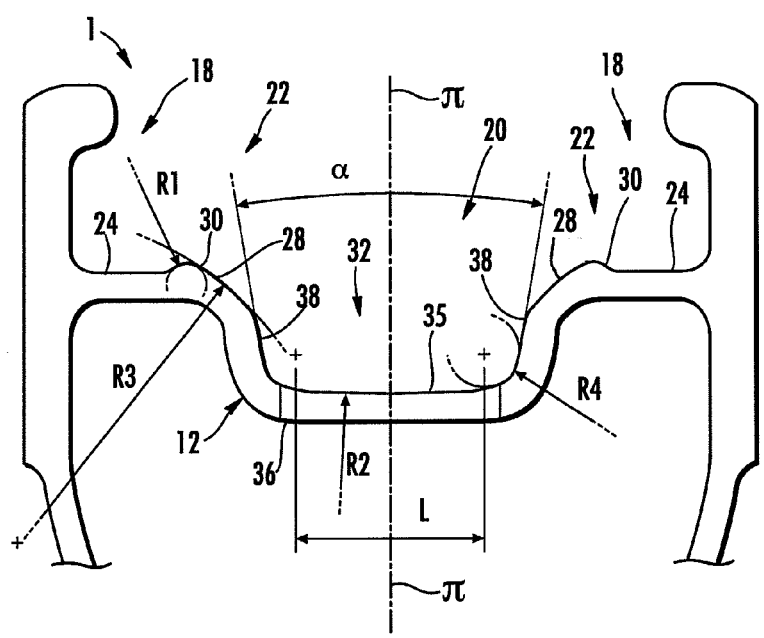
FIG. 7 schematically shows an enlarged view of a radially outer portion of a cross section of the rim of FIG. 1, taken along the plane P2 in FIG. 6.

With reference to FIG. 2, the bottom wall 12 comprises, in a central portion thereof bridging the plane of longitudinal symmetry Π of the rim, an annular recess 20. The hole 16 is formed substantially at the centre of the recess 20 (FIGS. 6 and 7).

The recess 20 defines a channel in which, in an initial assembly step of the tire 40, at least one of the beads 42 of the tire is housed.

Again, with reference to FIG. 2, the bottom wall 12 also comprises, on axially opposite sides with respect to the recess 20, and in a position adjacent to the two annular side walls 10, two side annular portions 24 substantially perpendicular to the plane of longitudinal symmetry Π of the rim 1, and between the annular recess 20 and each of the side annular portions 24, a projecting annular surface 22 having, in a transversal plane of the rim (such as that of FIG. 2), a curved profile.

The projecting annular surface 22 has a larger outer radial size than the outer radial size of the side portions 24 of the bottom wall 12 of the rim 1.

As illustrated in FIG. 9, the side portions 24 of the bottom wall 12 and the side walls 10 of the rim 1 define two respective seats 18 for housing the two opposite beads 42 of the tire 40, where they are arranged in a final assembled configuration of the tire. In the assembly step of the tire 40, the bead 42 positioned in the annular recess 20 must pass the projecting surface 22 to gain access to the respective seat 18.

Figure 3:
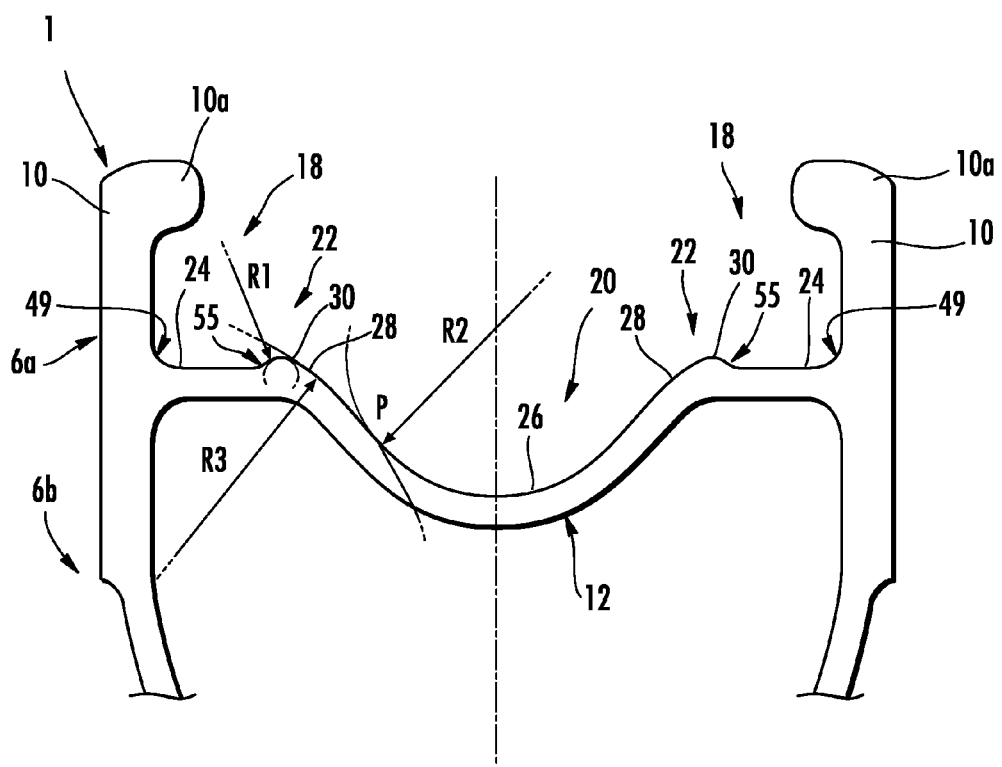
FIG. 3 schematically shows an enlarged view of a radially outer portion of the rim of FIG. 2.

Hereafter, with reference to FIG. 3, a detailed description of a first embodiment of the rim 1 shall be given. In particular, the surfaces that define the annular bottom wall 12 shall be defined in detail, conventionally considering as concave, convex or flat surfaces, those surfaces of revolution about the rotational axis of the rim respectively with a concave, convex or straight generatrix line in a cross section of the rim 1, made according to a radial plane passing through the aforementioned rotation axis, where the line is convex when the centre of curvature of such a line is on the side of the rotation axis of the rim whereas the line is concave when the centre of curvature is on the opposite side of the rotation axis of the rim.

Each side portion 24 of the bottom wall 12 comprises a radially outer flat surface orientated substantially perpendicular to the plane of longitudinal symmetry Π of the rim, whereas each side wall 10 comprises an axially inner flat surface, orientated substantially perpendicular to the rotational axis of the rim. The flat surfaces of the side portion 24 of the bottom wall 12 and of the side wall 10 are connected through a respective curved surface 49. The aforementioned flat surfaces, together with the radially outer end portion 10a of the side walls 10, define the seats 18 for housing the beads 42 of the tire 40.

Each projecting surface 22 is defined by a convex surface 30 with a bending radius R1 (in FIG. 3 a part of the circle of radius R1 is indicated with a thin line). The convex surface 30 is connected to the flat surface of the respective side portion 24 of the bottom wall 12 through a concave joining surface 55 having a small bending radius.

The recess 20 of the bottom wall 12 is defined by a plurality of surfaces. In particular, it comprises two convex side surfaces 28, each having a bending radius R3 and connected through a concave connecting surface 26 having a single bending radius R2 (in FIG. 3, sections of the circles of radii R2 and R3 are indicated by thin lines). At one side of the recess 20, a radially inner concave surface 26 and a radially outer convex surface 28 can thus be identified.

The convex side surfaces 28 are directly connected to the concave connecting surface 26, being tangent thereto at point P.

The convex side surfaces 28 are also directly connected to the convex surfaces 30.

Radius R3 is different from radius R2. Preferably, radius R3 is greater than radius R2 and more preferably is equal to about twice the radius R2, with the approximation of a few tenths of a millimeter.

The radius R2 is preferably between 2 mm and 5.5 mm, whereas the radius R3 is preferably about twice the radius R2.

For example, in a particularly preferred embodiment of the rim 1 illustrated in FIG. 3, radius R2 is equal to about 4.2 mm, radius R3 is equal to about 9 mm, radius R1 is between 0.20 mm and 3 mm, preferably equal to about 0.5 mm, and the radial distance between the convex surface 30 and the flat surface of the respective side portion 24 of the bottom wall 12 is equal to about 0.35 mm.

Figure 4:
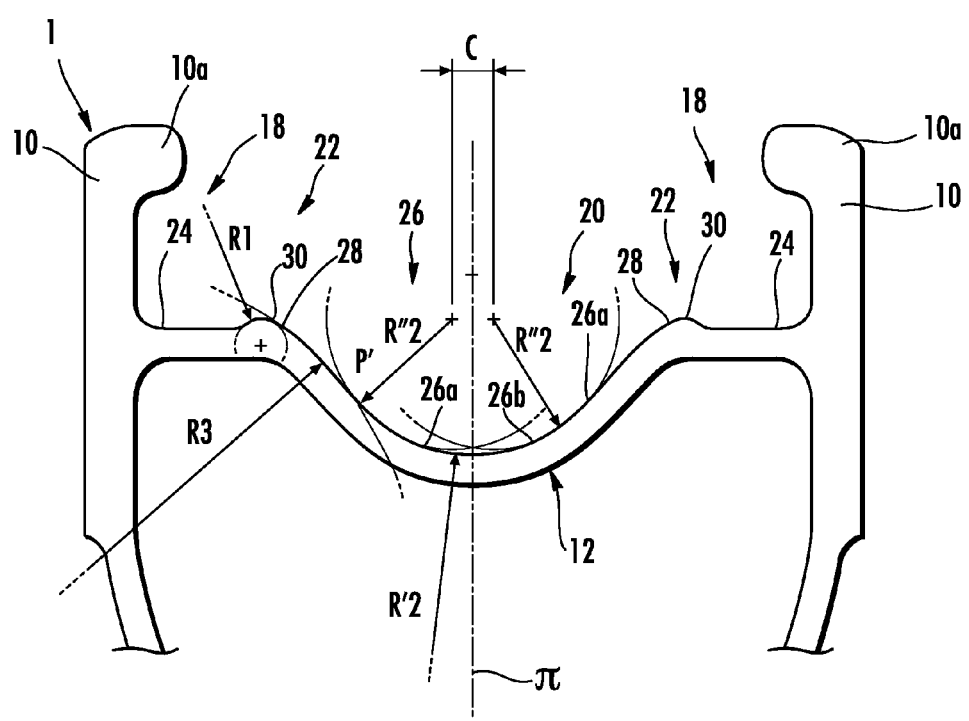
FIG. 4 schematically shows an enlarged cross sectional view of a radially outer portion of a second embodiment of the rim of FIG. 1.

FIG. 4 shows a second embodiment of the rim.

In FIG. 4, structural elements that are identical or equivalent from the functional point of view to those of the rim described above with reference to FIGS. 1-3 shall be indicated with the same reference numerals and they shall not be described any further.

The embodiment of FIG. 4 differs from that of FIG. 3 in that the connecting surface 26 is defined by surfaces having different bending radii. In particular, the connecting surface 26 comprises, in a central area 26b thereof, bridging the axis of longitudinal symmetry Π of the rim, a concave surface having a bending radius R'2, and at the annular areas 26a thereof, opposite the central area 26b, a concave surface having a bending radius R"2, different from R'2, and preferably lower than R'2.

In this case, the convex side surfaces 28 are directly connected to the concave surfaces of the annular areas 26a, being tangent thereto at point P'.

In a particularly preferred embodiment of the rim 1 illustrated in FIG. 4, the radius R'2 is equal to about 4.75 mm, the radius R"2 is equal to about 3.5 mm, the radius R3 is equal to about 7 mm, the radius R1 is equal to about 0.75 mm, and the radial distance between the convex surface 30 and the flat surface of the respective side portion 24 of the bottom wall 12 is equal to about 0.35 mm. The portion with radius R'2 extends in the axial direction along an arc of circumference having a cord C of a length equal to about 1.1 mm.

Figure 5:
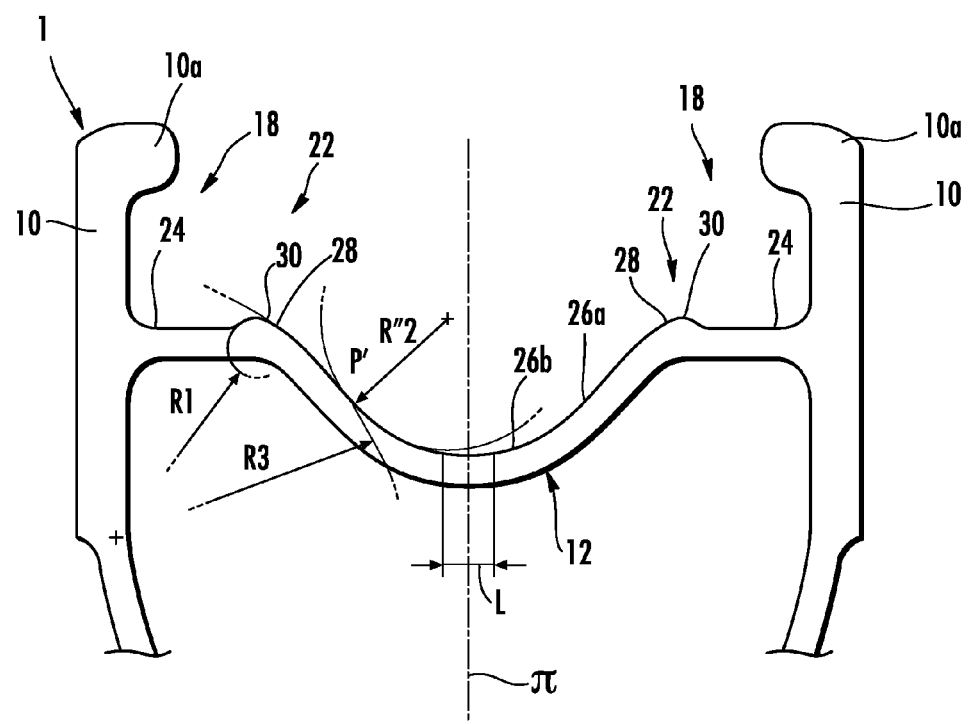
FIG. 5 schematically shows an enlarged cross sectional view of a radially outer portion of a third embodiment of the rim of FIG. 1.

FIG. 5 shows a third embodiment of the rim.

In FIG. 5, structural elements that are identical or equivalent from the functional point of view to those of the rim described above with reference to FIGS. 1-4 shall be indicated with the same reference numerals and they shall not be described any further.

The embodiment of FIG. 5 differs from that of FIG. 4 in that the connecting surface 26 is defined, at the central area 26b thereof bridging the axis of longitudinal symmetry Π of the rim, by a flat surface or a concave surface having a very large bending radius, such as to define a substantially flat surface. Such a surface is connected to the concave surfaces with bending radius R"2 of the annular areas 26a, opposite the central area 26b.

In a particularly preferred embodiment of the rim illustrated in FIG. 5, the radius R"2 is equal to about 3.5 mm, the radius R3 is equal to about 7 mm, the radius R1 is equal to about 1.5 mm and the radial distance between the convex surface 30 and the flat surface of the respective side portion 24 of the bottom wall 12 is equal to about 0.35 mm. The flat surface of the central area 26b extends in the axial direction for a length L equal to about 1.1 mm.

In a further embodiment (not illustrated) of the rim, the connecting surface is flat (and therefore has an infinite bending radius). It is possible to foresee further embodiments in which the value of the bending radius R2 can range from 2 mm to infinite.

As already stated, in the preferred embodiment, the rim 1 has an identical geometry along its entire annular extension, except at the hole 16, and in the area proximal to the hole 16.

FIG. 7 shows a cross section of the rim 1 at the hole 16. In this area of the rim 1, the bottom wall 12 of the rim 1 is shaped to form a seat 32 (FIGS. 6, 7 and 9) for the head 46 of the inflation valve 48 of the tire. In FIG. 7, structural elements that are identical or equivalent from the functional point of view to those of the rim described above with reference to FIGS. 1-6 shall be indicated with the same reference numerals and they shall not be described any further.

As shown in FIGS. 6 and 7, at the hole 16 the recess 20 comprises two flat side surfaces 38 inclined by a predetermined angle α with respect to the plane of longitudinal symmetry of the rim 1. The two side surfaces 38 are connected by a substantially flat connecting surface 36, or a concave surface having a very large bending radius R2, such as to define a substantially flat surface. The two flat surfaces 38 are connected by the connecting surface 36 through a surface having a bending radius R4. The two flat surfaces 38 define, with the connecting surface 36, the seat 32 for housing the head 46 of the inflation valve 48 of the tire (FIG. 9).

In a radially outer position with respect to the flat surfaces 38, i.e. on the opposite side of the connecting surface 36 with respect to the flat surfaces 38, the recess 20 comprises two convex side surfaces 28 having a bending radius R3, in a way totally identical to what has been described above with reference to FIGS. 3-5. The bottom wall 12 also comprises, in an axially outer position with respect to the recess 20, two convex projecting surfaces 30 having a bending radius R1 and two side portions 24 having flat surfaces, in a way totally identical to what has been described above with reference to FIGS. 3-5.

Figure 8:
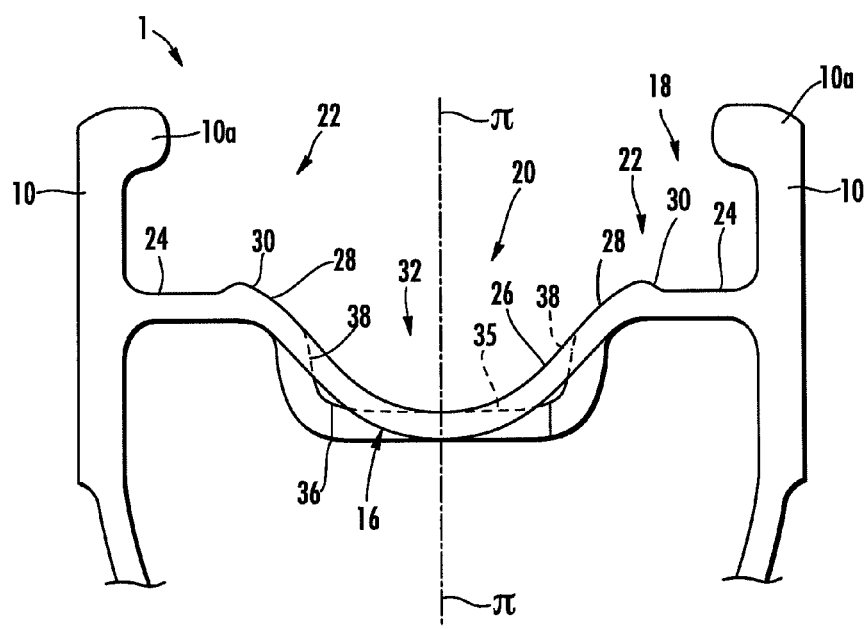
FIG. 8 schematically shows an enlarged view of a radially outer portion of a cross section of the rim of FIG. 1, taken along the plane P3 in FIG. 6.

Preferably, moving in the radial direction outwards from the radially outer end of the flat surfaces 38, the rim 1 has the same geometry along its entire annular extension, even at the hole 16 and at the area proximal to the hole 16, such a geometry being different only in the radially inner area of the recess 20 with respect to the convex side surfaces 28. FIG. 8, which is a section of the rim 1 according to the radial plane P3 of FIG. 6, shows the difference in geometry of the bottom wall 12, and in particular of the annular recess 20 formed in the bottom wall 12, between an area of the rim in which the hole 16 is not present, and the area of the rim in which the hole 16 is formed. It should be noted how, at the hole 16, the base of the recess 20 is longer in the axial direction than it is in other areas of the rim 1.

In particularly preferred embodiments of the rim, at the hole 16, the connecting surface 36 has a bending radius R2 equal to about 35 mm and a length L in the axial direction equal to about 53 mm (the surface 36 is thus substantially flat). In such embodiments, the angle of inclination α is equal to about 18°, the radius R4 is equal to about 1 mm, the radius R3 is equal to about 9 mm, or alternatively 7 mm (depending on the size of the recess 20 in the areas of the rim distal from the hole 16), the radius R1 is equal to about 0.5 mm, or alternatively 0.75 mm, or alternatively again 1.5 mm (depending on the size of the recess 20 in the areas of the rim distal from the hole 16), and the radial distance between the convex surface 30 and the flat surface of the respective side portion 24 of the bottom wall 12 is equal to about 0.35 mm.

Figure 10:
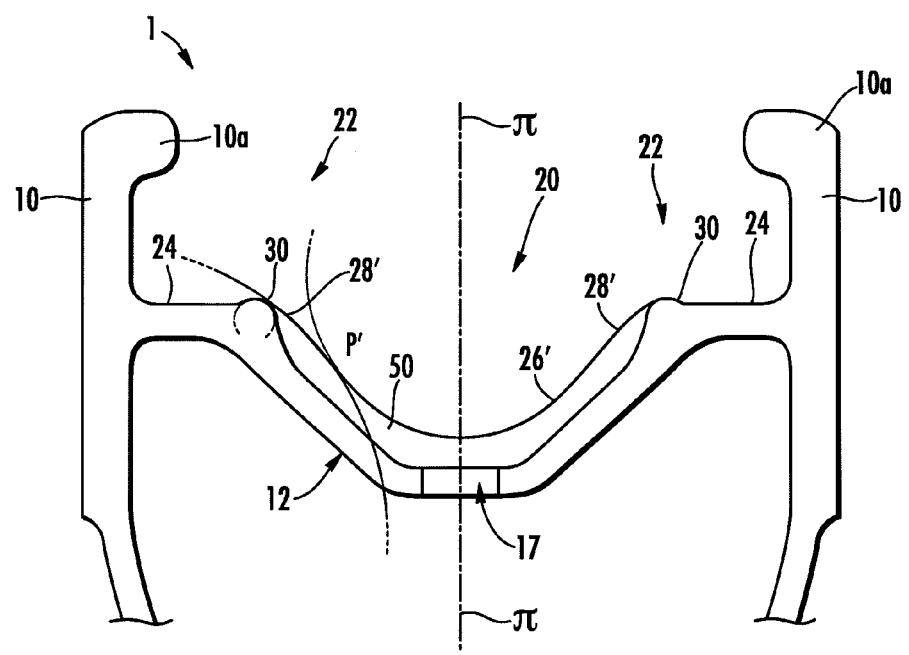
FIG. 10 schematically shows a cross section of an alternative embodiment of a rim.
Figure 11:
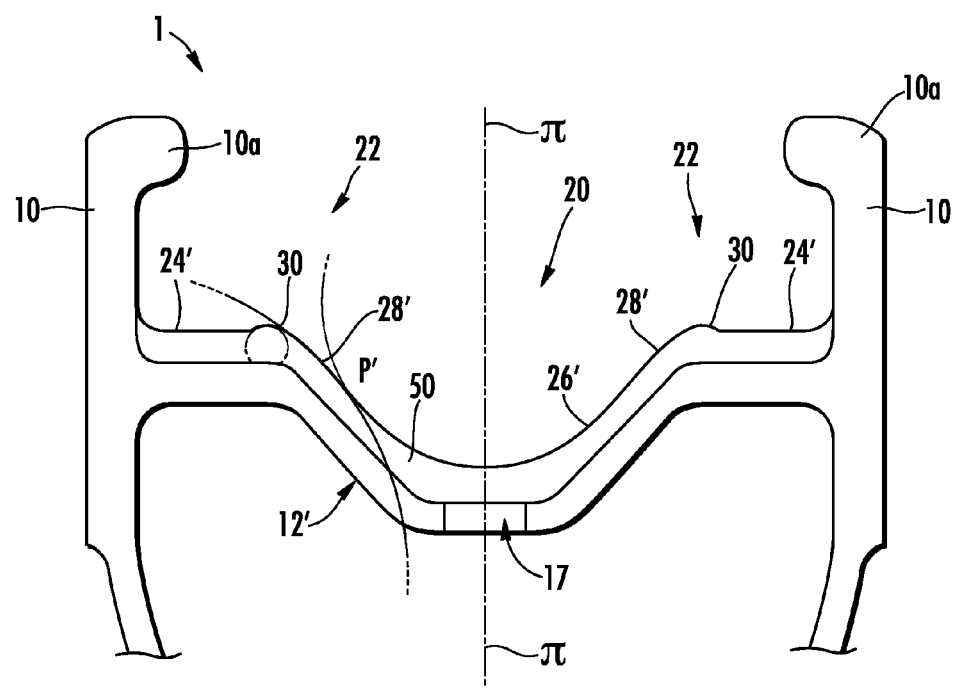
FIG. 11 schematically shows a cross section of a further alternative embodiment of a rim.

FIGS. 10 and 11 show alternative embodiments of the rim. In such FIGS., structural elements that are identical or equivalent from the structural and functional point of view to those of the rim described above with reference to FIGS. 1-9 shall be indicated with the same reference numerals and they shall not be described any further.

Such a rim differs from the one described above and illustrated in FIGS. 1 to 9 by the different profile in cross section of the bottom wall 12 and by the arrangement on the upper bridge 12 of a band 50.

As illustrated, the upper bridge 12 comprises, in addition to the inflation hole 16 (not visible in FIG. 10), further holes 17 for the assembly of spokes of the wheel. The holes 17 are spaced apart on the bottom wall 12, and from the hole 16, in the circumferential direction.

The band 50 is of the type described in US2004/0095014, but differs from it by its radially outer profile, with reference to a cross section of the band. In particular, the band 50 has an identical profile to that of the radially outer surface of the recess 20 of the rim described previously with reference to FIG. 3.

More specifically, the outer surface of the band 50 comprises a concave radially inner surface 26' and two opposite convex radially outer surfaces 28' totally identical to the surfaces 26 and 28 described with reference to FIG. 3. Such surfaces are connected together (in a single tangent point P') and to the concave surfaces 30 of the projecting surfaces 22 in a totally identical way to what has been described above with reference to FIG. 3.

The profile of the band 50 can also be different from the one illustrated in FIG. 10. For example, the band can have any of those profiles described above with reference to the other embodiments that have or have not been illustrated, or it can be identical to that of the radially outer surface of the entire bottom wall 12 of the rim described previously with reference to FIG. 3. In this embodiment, as illustrated in FIG. 11, the band 50 also comprises two flat side portions 24', and two projecting surfaces 22, having an outer profile totally identical to that of the side portions 24, and of the projecting surfaces 22 of the upper bridge 12 of the rim described previously with reference to FIG. 3.

In any case, in the embodiments of the rim in which the band 50 is used, the profile of the recess 20 of the upper bridge 12' of the rim does not have particular innovative characteristics, the particular desired shape of the recess 20 being obtained upon application of the band 50 onto the bottom wall 12'.

The rim 1 can be made from any material, for example metal, such as an aluminum alloy. In combination with or as an alternative to metallic material, it is possible to use a structural composite material.

Composite material is defined as a material consisting of at least two components including a polymeric matrix and a filler, for example comprising structural fibers, granules, or powders. The structural fibers are preferably selected from the group consisting of carbon fibers, glass fibers, aramid fibers, ceramic fibers, boron fibers and combinations thereof. Carbon fibers are particularly preferred. Preferably, the polymeric material is thermosetting and preferably comprises an epoxy resin. However, the possibility of using a thermoplastic material is not excluded.

Structural composite materials are defined as those materials that contain structural fibers with a length of over five millimeters. The arrangement of the structural fibers in the polymeric material can be a random arrangement of pieces or sheets of structural fibers, a substantially unidirectional ordered arrangement of fibers, a substantially bidirectional ordered arrangement of fibers or a combination of the above.

In the case in which the band 50 is used, such a band is preferably made from polymeric material, more preferably polypropylene, possibly reinforced with a polyester fabric.

Obviously, a person having ordinary skill in the art could envision numerous modifications and variants of the rim described above, in order to satisfy specific and contingent requirements, all of which are considered to be within the scope of the following claims.

What is claimed is:

1. A rim for a bicycle wheel comprising a body with a substantially annular extension having a radially outer portion shaped for coupling with a tire, said radially outer portion comprising an annular bottom wall provided with a depressed inflation valve area that includes a hole for an inflation valve, said annular bottom wall comprising a central annular recess and two side annular portions arranged on axially opposite sides with respect to said central annular recess, said recess comprising, at least on one side thereof closest to the radially outer portion shaped for coupling with the tire, and at least in an area circumferentially distal from said hole, with reference to a cross section of the rim, a radially inner connecting surface and a radially outer side surface with respect to said center of said rim, wherein said radially outer side surface comprises a convex curved surface, and said radially inner connecting surface comprises a concave curved surface having at least one bending radius, said radially inner connecting surface and said radially outer side surface connect at a common tangent point, and said radially outer side surface has a greater bending radius than a bending radius of said radially inner connecting surface, wherein said annular bottom wall in said depressed inflation valve area has a shape that is different from that of said annular bottom wall which is circumferentially distal from said depressed inflation valve area.

2. The rim of claim 1, wherein the bending radius of said radially outer side surface is equal to approximately twice that of said bending radius of said radially inner connecting surface.

3. The rim of claim 1, wherein said annular bottom wall comprises, between said radially outer side surface and at least one of said side annular portions, a projecting surface.

4. The rim of claim 3, wherein said projecting surface is defined by a curved surface.

5. The rim of claim 1, wherein said annular bottom wall comprises, between said radially outer side surface and at least one of said side annular portions, a projecting surface defined by a curved surface, and said radially outer side surface and said projecting annular surface are connected in a common tangent point.

6. The rim of claim 1, wherein said side annular portions are substantially perpendicular to a plane of longitudinal symmetry of said rim.

7. The rim of claim 1, wherein said radially inner connecting surface is entirely defined by a curved surface.

8. The rim of claim 7, wherein said curved surface has a single bending radius.

9. The rim of claim 7, wherein said curved surface has a first bending radius at a radially inner portion thereof and a second bending radius at a radially outer portion thereof.

10. The rim of claim 9, wherein said second bending radius is smaller than said first bending radius.

11. The rim of claim 9, wherein said at least one portion of curved surface is defined at said radially outer portion.

12. The rim of claim 1, wherein said radially inner connecting surface is defined by a substantially flat surface portion and a curved surface portion.

13. The rim of claim 12, wherein said flat surface portion is axially inward with respect to said curved surface portion.

14. The rim of claim 1, wherein said recess comprises, at least on one side thereof closest to the radially outer portion shaped for coupling with the tire and in the depressed inflation valve area, with reference to a cross section of the rim, an at least partially flat radially outer surface and a substantially flat radially inner surface.

15. The rim of claim 14, wherein said at least partially flat radially outer surface comprises a flat surface portion adjacent to said substantially flat radially inner surface and a curved surface portion arranged on the opposite side to said substantially flat radially inner surface with respect to said flat surface portion.

16. The rim of claim 15, wherein said curved surface portion has the same bending radius as that of the radially outer side surface of said recess at said area distal from said hole.

17. The rim of claim 1, wherein said rim is a rim for a tubeless wheel.

18. The rim of claim 1, wherein said rim is made from metallic material.

19. The rim of claim 1, wherein said rim is made from structural composite material.

20. A bicycle wheel comprising a rim, the rim comprising a body with a substantially annular extension having a radially outer portion shaped for coupling with a tire, said radially outer portion comprising an annular bottom wall provided with a depressed inflation valve area that includes a hole for an inflation valve, said annular bottom wall comprising a central annular recess and two side annular portions arranged on axially opposite sides with respect to said central annular recess, said recess comprising, at least on one side thereof closest to the radially outer portion shaped for coupling with the tire, and at least in an area circumferentially distal from said hole, with reference to a cross section of the rim, a radially inner connecting surface and a radially outer side surface with respect to said center of said rim, wherein said radially outer side surface comprises a convex curved surface, and said radially inner connecting surface comprises a concave curved surface having at least one bending radius, said radially inner connecting surface and said radially outer side surface connect at a common tangent point, and said radially outer side surface has a greater bending radius than a bending radius of said radially inner connecting surface, wherein said annular bottom wall in said depressed inflation valve area has a shape that is different from that of said annular bottom wall which is circumferentially distal from said depressed inflation valve area.

\* \* \* \* \*